United States Patent
Zhu et al.

(10) Patent No.: US 10,812,833 B2
(45) Date of Patent: Oct. 20, 2020

(54) PANORAMIC IMAGE COMPRESSION METHOD AND APPARATUS

(71) Applicant: BEIJING QIYI CENTURY SCIENCE & TECHNOLOGY CO., LTD., Beijing (CN)

(72) Inventors: Jiadan Zhu, Beijing (CN); Tao Wang, Beijing (CN)

(73) Assignee: BEIJING QIYI CENTURY SCIENCE & TECHNOLOGY CO., LTD., Beijing (CN)

( * ) Notice: Subject to any disclaimer, the term of this patent is extended or adjusted under 35 U.S.C. 154(b) by 128 days.

(21) Appl. No.: 16/310,875

(22) PCT Filed: Aug. 30, 2017

(86) PCT No.: PCT/CN2017/099694
§ 371 (c)(1),
(2) Date: Dec. 18, 2018

(87) PCT Pub. No.: WO2018/120888
PCT Pub. Date: Jul. 5, 2018

(65) Prior Publication Data
US 2020/0177925 A1    Jun. 4, 2020

(30) Foreign Application Priority Data
Dec. 29, 2016 (CN) .......................... 2016 1 1248836

(51) Int. Cl.
*H04N 19/85* (2014.01)
*H04N 19/132* (2014.01)
(Continued)

(52) U.S. Cl.
CPC ........... *H04N 19/85* (2014.11); *G06T 3/0031* (2013.01); *H04N 19/132* (2014.11); *H04N 19/182* (2014.11); *H04N 19/597* (2014.11)

(58) Field of Classification Search
None
See application file for complete search history.

(56) References Cited

U.S. PATENT DOCUMENTS 9,589,317 B2 * 3/2017 Ozaki .................. G06T 3/0062
9,984,436 B1 * 5/2018 Chen .................. H04N 5/23238
(Continued)

FOREIGN PATENT DOCUMENTS

| CN | 101706967 | 5/2010 |
| CN | 101271187 | 4/2012 |

(Continued)

OTHER PUBLICATIONS

Ghaznavi Youvalari et al., "Analysis of regional down-sampling methods for coding of omnidirectional video" 2016 Picture Coding Symposium (PCS). 2016.
(Continued)

*Primary Examiner* — Iman K Kholdebarin
(74) *Attorney, Agent, or Firm* — Norton Rose Fulbright US LLP

(57) ABSTRACT

A panoramic image compression method and device is disclosed. The method comprises: obtaining a first spherical model formed by a first panoramic image to be compressed; generating a second spherical model in the first spherical model according to a main view image of an user; establishing a first mapping relationship between plane 2D rectangular coordinates in a second panoramic image and plane 2D rectangular coordinates in the first panoramic image; and sampling, from the first panoramic image, pixels corresponding to plane 2D rectangular coordinates in the second panoramic image according to the first mapping relationship to constitute the second panoramic image containing the pixels, so as to realize the compression of the first panoramic image.

12 Claims, 3 Drawing Sheets

(51) Int. Cl.
*H04N 19/182* (2014.01)
*H04N 19/597* (2014.01)
*G06T 3/00* (2006.01)

(56) References Cited

U.S. PATENT DOCUMENTS

| | | | | |
|---|---|---|---|---|
| 10,567,648 | B2* | 2/2020 | Park | G11B 27/031 |
| 10,685,467 | B2* | 6/2020 | Choi | H04N 13/178 |
| 2009/0022421 | A1* | 1/2009 | Uyttendaele | G06T 3/4038 |
| | | | | 382/284 |
| 2013/0243351 | A1* | 9/2013 | Feng | G06T 3/4038 |
| | | | | 382/284 |
| 2015/0172545 | A1* | 6/2015 | Szabo | H04N 5/23238 |
| | | | | 348/36 |
| 2018/0322685 | A1* | 11/2018 | Yi | G06T 15/04 |

FOREIGN PATENT DOCUMENTS

| | | | |
|---|---|---|---|
| CN | 102508398 | 6/2012 | |
| CN | 104244019 | 12/2014 | |
| CN | 105631809 | 6/2016 | |
| CN | 105913379 | 8/2016 | |
| CN | 105915907 | 8/2016 | |
| CN | 105933707 | 9/2016 | |
| CN | 106023070 | 10/2016 | |
| CN | 106651764 | 5/2017 | |
| EP | 2490179 | 8/2012 | |
| EP | 2490179 A1 * | 8/2012 | H04N 19/597 |
| JP | 2011-217300 | 10/2011 | |
| JP | 2014127001 | 7/2014 | |
| JP | 2015521442 | 7/2015 | |
| KR | 2005-0091278 | 9/2005 | |
| WO | WO 2005/055607 | 6/2005 | |

OTHER PUBLICATIONS

International Search Report and Written Opinion issued in International Patent Application No. PCT/CN2017/099694, dated Oct. 27, 2017.
Ikeda et al., "Constructing Virtual Spaces Based on Panorama Images" DBSJ Letters, Jun. 2006, 5(1), pp. 97-100.
Liu et al., "Multi-resolution Panoramic Modeling Based on Spherical Projective Geometry" 2$^{nd}$ International Conference on Computer Science and Network Technology 2012, Honghe University, 2171-2174.
Matsuba et al. "A Direction Estimation Method by Using RANSAC Algorithm for Constructing Panorama Virtual Spaces" Forum on Information Technology 2013, Aug. 2013, D-023, pp. 135-136.
Office Action issued in Corresponding Japanese Application No. 2019-504789, dated Mar. 4, 2020 (English Translation Provided).
Office Action issued in Corresponding Korean Application No. 10-2019-700631, dated Feb. 20, 2020 (English Translation Provided).
Youvalari et al., "Analysis of Regional Down-Sampling Methods for Coding of Omnidirectional Video" IEEE PCS, 2016, 9 pages.
Office Action issued in Corresponding Chinese Patent application No. 201611248836, dated Mar. 1, 2019 (English Translation).
Extended Search Report issued in Corresponding European Patent Application No. 17886395, dated May 16, 2019.
Notice of Allowance issued in Corresponding Taiwanese Patent Application No. 106134203, dated Nov. 30, 2017.

* cited by examiner

PANORAMIC IMAGE COMPRESSION METHOD AND APPARATUS

The present application claims the priority to a Chinese patent application No. 201611248836.9, filed before the State Intellectual Property Office of PRC on Dec. 29, 2016 and entitled "PANORAMIC IMAGE COMPRESSION METHOD AND APPARATUS", which is incorporated herein by reference in its entirety.

TECHNICAL FIELD

The present application relates to the technical field of image processing, and particularly to a panoramic image compression method and device.

BACKGROUND

In recent years, with rapid development of VR (Virtual Reality), various hardware and software used in VR have appeared one after another. Among them, panoramic video VR has become the focus of the technological research and development and product innovation, is widely applied in many areas such as virtual cinemas, panoramic games, panoramic education, panoramic medical therapy, panoramic tourism, and have broad prospects and great economic value.

Panoramic videos usually require to capture panoramic images with ultra high resolutions over 4K, so that content of partial viewing angle of users can be clearly displayed in players. Since panoramic images with ultra high resolutions over 4K have large number of pixels over 3840×1920, which brings a challenge of large data sizes to the storage, compression, transmission, decoding and rendering of panoramic images. Besides, panoramic images encompass full angle pictures, but users only can view image content in a limited angle of view due to the limitation of human eyes when viewing. Generally speaking, in a panoramic image, the pixels of the display area occupy only one eighteenth of all pixels of the panoramic image in the video content of the limited angle of view that the human eye sees.

In the prior art, in the compression of a panoramic image, if the compression rate is high, the panoramic image will be unclear when viewed by users, but if the compression rate is not high, the panoramic image will be too large and is not advantageous for the storage, transmission and decoding. Overall, the compression of panoramic images and the definitions thereof when viewed by users can not be guaranteed at the same time.

CONTENTS OF THE INVENTION

Embodiments of the present application aim to provide a panoramic image compression method and device, which improve the definition of a part of images at a main viewing angle of users while guarantee a higher compression rate by non-uniform sampling and compression of a source panoramic image. The specific technical solutions are as follows.

Embodiments of the present application disclose a panoramic image compression method, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and sampling, from the first panoramic image, pixels corresponding to plane 2D rectangular coordinates in the second panoramic image according to the first mapping relationship to constitute the second panoramic image containing the pixels, so as to realize the compression of the first panoramic image.

Optionally, generating a second spherical model in the first spherical model according to a main view image of users comprises:

determining the radius of the second spherical model according to a preset resolution of the second panoramic image; and determining a location of the spherical center of the second spherical model in the first spherical model according to the main view image of the user.

Optionally, establishing a first mapping relationship between plane 2D rectangular coordinates in a second panoramic image and plane 2D rectangular coordinates in the first panoramic image comprises:

establishing a first correspondence between plane 2D rectangular coordinates of all pixels in the first panoramic image and coordinates in the first spherical model;

establishing a second correspondence between coordinates in the first spherical model and coordinates in the second spherical model;

establishing a third correspondence between coordinates in the second spherical model and plane 2D rectangular coordinates in the second panoramic image; and correlating plane 2D rectangular coordinates in the second panoramic image to coordinates in the second spherical model according to the third correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the first mapping relationship between plane 2D rectangular coordinates in the second panoramic image and plane 2D rectangular coordinates in the first panoramic image.

Optionally, before establishing a second correspondence between coordinates in the first spherical model and coordinates in the second spherical model, the method further comprises:

performing coordinate system transformation on a 3D rectangular coordinate system of the first spherical model when the spherical center of the second spherical model is not located at x axis of the 3D rectangular coordinate system of the first spherical model, wherein, the coordinate system transformation comprises: rotating the x axis of the first spherical model such that the spherical center of the second spherical model is located at the rotated x axis.

Embodiments of the present application disclose a panoramic image displaying method, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and sampling, from the first panoramic image, pixels corresponding to plane 2D rectangular coordinates in the 2D projection plane according to the second mapping relationship to constitute the 2D projection plane containing the pixels that is viewable directly by the user.

Optionally, establishing a second mapping relationship between plane 2D rectangular coordinates of a 2D projection plane and plane 2D rectangular coordinates in the first panoramic image comprises:

establishing a first correspondence between plane 2D rectangular coordinates of all pixels in the first panoramic image and coordinates in the first spherical model; establishing a second correspondence between coordinates in the first spherical model and coordinates in the second spherical model;

establishing a fourth correspondence between coordinates in the second spherical model and plane 2D rectangular coordinates of the 2D projection plane; and correlating plane 2D rectangular coordinates of the 2D projection plane to coordinates in the second spherical model according to the fourth correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the second mapping relationship between plane 2D rectangular coordinates of the 2D projection plane and plane 2D rectangular coordinates in the first panoramic image.

Embodiments of the present application disclose a panoramic image compression device, comprising:

an obtaining module used for obtaining a first spherical model formed by a first panoramic image to be compressed, wherein there is a correspondence between plane 2D rectangular coordinates of all pixels in the first panoramic image and coordinates in the first spherical model;

a generating module used for generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

a mapping module used for establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and a sampling module used for sampling, from the first panoramic image, pixels corresponding to plane 2D rectangular coordinates in the second panoramic image according to the first mapping relationship to constitute the second panoramic image containing the pixels, so as to realize the compression of the first panoramic image.

Optionally, the generating module is specifically used for:

determining the radius of the second spherical model according to a preset resolution of the second panoramic image; and determining a location of the spherical center of the second spherical model in the first spherical model according to the main view image of the user.

Optionally, the mapping module comprises:

a first corresponding submodule used for establishing a first correspondence between plane 2D rectangular coordinates of all pixels in the first panoramic image and coordinates in the first spherical model;

a second corresponding submodule used for establishing a second correspondence between coordinates in the first spherical model and coordinates in the second spherical model;

a third corresponding submodule used for establishing a third correspondence between coordinates in the second spherical model and plane 2D rectangular coordinates in the second panoramic image; and a first mapping submodule used for correlating plane 2D rectangular coordinates in the second panoramic image to coordinates in the second spherical model according to the third correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the first mapping relationship between plane 2D rectangular coordinates in the second panoramic image and plane 2D rectangular coordinates in the first panoramic image.

Optionally, the device further comprises:

a selection submodule used for, before the second corresponding submodule establishing a second correspondence between coordinates in the first spherical model and coordinates in the second spherical model, performing coordinate system transformation on a 3D rectangular coordinate system of the first spherical model when the spherical center of the second spherical model is not located at x axis of the 3D rectangular coordinate system of the first spherical model, wherein, the coordinate system transformation comprises: rotating the x axis of the first spherical model such that the spherical center of the second spherical model is located at the rotated x axis.

Embodiments of the present application disclose a panoramic image displaying device, comprising:

an obtaining module used for obtaining a first spherical model formed by a first panoramic image to be compressed, wherein there is a correspondence between plane 2D rectangular coordinates of all pixels in the first panoramic image and coordinates in the first spherical model;

a generating module used for generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than radius of the first spherical model, and the main view image of the user is a partial image of the first panoramic image that is viewed mainly by the user;

a mapping establishment module used for establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and a pixel sampling module used for sampling, from the first panoramic image, pixels corresponding to plane 2D rectangular coordinates in the 2D projection plane according to the second mapping relationship to constitute the 2D projection plane containing the pixels that is viewable directly by the user.

Embodiments of the present application disclose an electronic apparatus, which comprises: a processor, a communication interface, a memory and a communication bus, wherein the processor, the communication interface and the memory are communicated with each other via the communication bus;

the memory is used for storing a computer program; and the processor is used for executing the program stored in the memory, so as to implement the panoramic image compression method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and sampling, from the first panoramic image, pixels corresponding to plane 2D rectangular coordinates in the second panoramic image according to the first mapping relationship to constitute the second panoramic image containing the pixels, so as to realize the compression of the first panoramic image.

Embodiments of the present application disclose an electronic apparatus, which comprises: a processor, a communication interface, a memory and a communication bus, wherein the processor, the communication interface and the memory are communicated with each other via the communication bus;

the memory is used for storing a computer program; and the processor is used for executing the program stored in the memory, so as to implement the panoramic image displaying method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and sampling, from the first panoramic image, pixels corresponding to plane 2D rectangular coordinates in the 2D projection plane according to the second mapping relationship to constitute the 2D projection plane containing the pixels that is viewable directly by the user.

Embodiments of the present application disclose a computer readable storage medium, which stores a computer program thereon, and when being executed by a processor, the computer program implements the panoramic image compression method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and sampling, from the first panoramic image, pixels corresponding to plane 2D rectangular coordinates in the second panoramic image according to the first mapping relationship to constitute the second panoramic image containing the pixels, so as to realize the compression of the first panoramic image.

Embodiments of the present application disclose a computer readable storage medium, which stores a computer program thereon, and when being executed by a processor, the computer program implements the panoramic image displaying method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and sampling, from the first panoramic image, pixels corresponding to plane 2D rectangular coordinates in the 2D projection plane according to the second mapping relationship to constitute the 2D projection plane containing the pixels that is viewable directly by the user.

A panoramic image compression method and device provided by embodiments of the present application compress a panoramic image to be compressed into an non-uniform panoramic image by non-uniformly sampling the panoramic image to be compressed, for a part of images at a main viewing angle of users, a higher sampling rate is set so as to guarantee the definitions of images viewed by users, and for the other part of images, a lower sampling rate is utilized so as to enable a smaller panoramic image after overall compression and facilitate the storage, transmission and decoding. Of course, any product or method implementing the present application does not necessarily achieve all the advantages described above at the same time.

BRIEF DESCRIPTION OF THE DRAWINGS

In order to describe the technical solutions in embodiments of the present application or in the prior art more clearly, a brief introduction will be given below for the drawings required for the description of embodiments or the prior art. It is obvious that the drawings below are for only some embodiments of the present application, and those skilled in the art can also obtain further drawings based on these drawings without any creative efforts.

SPECIFIC MODE FOR CARRYING OUT THE INVENTION

The technical solutions in embodiments of the present application will be described clearly and completely below in conjunction with the accompanying drawings in embodiments of the present application. Obviously, the described embodiments are only some of the embodiments of the present application, rather than all of the embodiments. All other embodiments obtained based on the embodiments of the present application by those skilled in the art without doing creative works fall into the protection scope defined by the present application.

Figure 1:
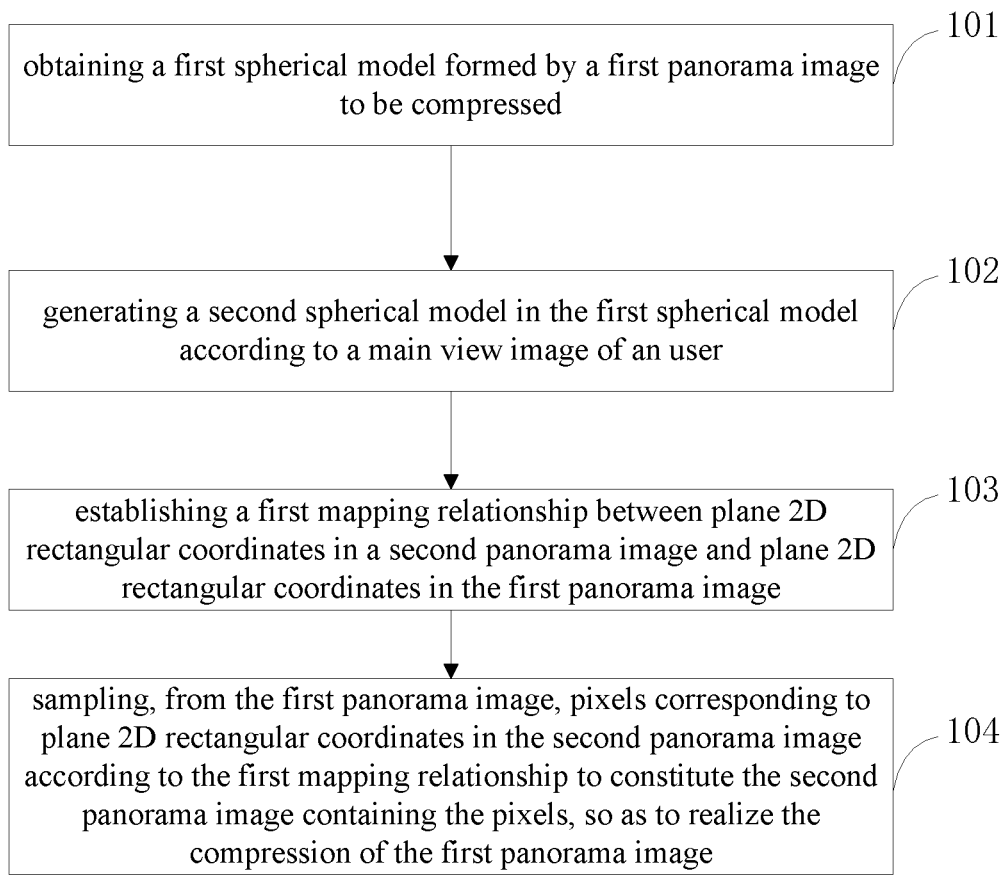
FIG. 1 is a flowchart of a panoramic image compression method provided by embodiments of the present application.

Refer to FIG. 1, which is a flowchart of a panoramic image compression method provided by embodiments of the present application, comprising:

Step 101, obtaining a first spherical model formed by a first panoramic image to be compressed, wherein there is a correspondence between plane 2D rectangular coordinates of all pixels in the first panoramic image and coordinates in the first spherical model.

A panoramic image is an image that can record and present content of a full-angle viewing angle. In the VR field, the most commonly used panoramic image is a panoramic image in an Equirectangular (isometric rectangular projection) format. Equirectangular panoramic images can cover 360° horizontal viewing angle and 180° vertical viewing angle, thus forming a picture that surrounds the whole scene. Embodiments of the present application are introduced by using Equirectangular panoramic images as an example. However, embodiments of the present application are not only used in Equirectangular panoramic images, panoramic images in other formats can also compressed by the method provided by embodiments of the present application.

Figure 2:
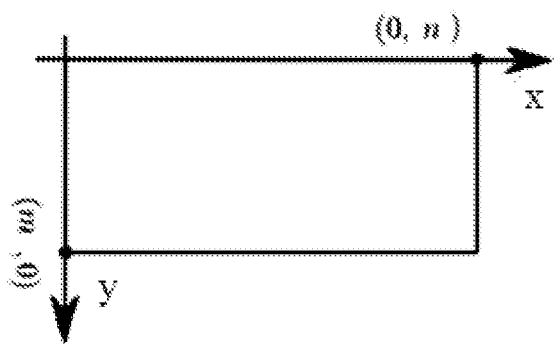
FIG. 2 is a schematic diagram of an Equirectangular panoramic image provided by embodiments of the present application.

Refer to FIG. 2, which is a schematic diagram of an Equirectangular panoramic image provided by embodiments of the present application. Wherein, m is the height of a panoramic image, n is the width of a panoramic image. Each coordinate in a panoramic image corresponds to a pixel.

A panoramic image can be transformed into a spherical model, which is equivalent to a panoramic image covering a complete spherical surface of 360 degrees, all images of the full viewing angle can be viewed within the spherical model, the radius of the spherical model can be expressed by formula (1):

$$R = \frac{n}{2\pi} \quad (1)$$

Wherein, R is the radius of a spherical model, n is the width of a panoramic image, and $\pi$ is the PI.

Figure 3:
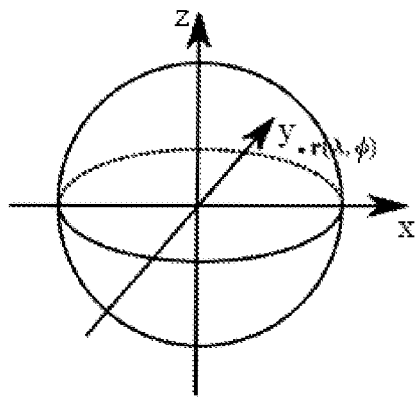
FIG. 3 is a spherical model transformed from an Equirectangular panoramic image provided by embodiments of the present application.

Refer to FIG. 3, which is a spherical model transformed from an Equirectangular panoramic image provided by embodiments of the present application. Wherein, point r is any point on the surface of a spherical model, $\lambda$ represents the longitude of a coordinate in a spherical model, and $\phi$ represents the latitude of a coordinate in a spherical model.

Figure 4:
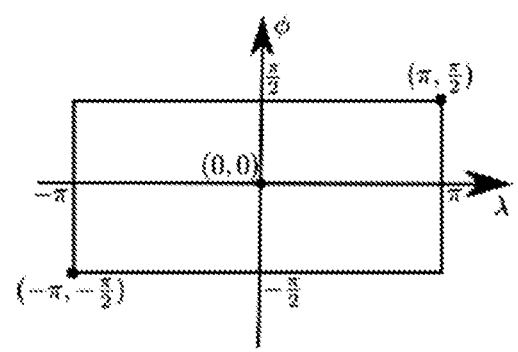
FIG. 4 is the range of values of $\lambda$ and $\phi$ provided by embodiments of the present application.

FIG. 4 is the range of values of $\lambda$ and $\phi$ provided by embodiments of the present application, wherein, the range of values of $\lambda$ is $(-\pi,\pi)$, the range of values of $\phi$ is $$\left(-\frac{\pi}{2}, \frac{\pi}{2}\right).$$

On the surface of a spherical model, coordinates of any point can be expressed either by polar coordinates or by 3D rectangular coordinates. The 3D rectangular coordinates and spherical polar coordinates can be transformed by the following formula (2):

$$x_1 = R \cos \lambda \cos \phi;$$
$$y_1 = R \sin \lambda \cos \phi;$$
$$z_1 = R \sin \phi; \quad (2)$$

Wherein, $x_1$, $y_1$, $z_1$ represent 3D rectangular coordinates of a point on a spherical model, $\lambda$ represents the longitude in coordinates in a spherical model, $\phi$ represents the latitude in coordinates in a spherical model, i.e., polar coordinates in a spherical model, R represents the radius of a spherical model. During the application of the above formula, when the radius R of a spherical model is not multiplied, locations of 3D rectangular coordinates in a spherical model constituted by a unit circle can be represented, and when the radius R of a spherical model is multiplied, locations of 3D rectangular coordinates in a spherical model constituted at a actual size of a panoramic image can be represented.

When a panoramic image is transformed into a spherical model, plane 2D rectangular coordinates of all pixels in the panoramic image have a correspondence with coordinates in the spherical model. Specifically, the correspondence between plane 2D rectangular coordinates in a panoramic image and coordinates in a spherical model can be determined by the following formula (3):

$$x = m - \left(\frac{\phi + \frac{\pi}{2}}{\pi}\right)m \quad (3)$$

-continued
$$y = \left(\frac{\lambda + \pi}{2\pi}\right)n$$

Wherein, x, y are plane 2D rectangular coordinates of a pixel in a spherical model, m is the height of a panoramic image, n is the width of a panoramic image, $\lambda$ represents the longitude of a coordinate in a spherical model, $\phi$ represents the latitude in a coordinate in a spherical model, and $\pi$ is PI.

This formula represents the correspondence between plane 2D rectangular coordinates in a panoramic image and coordinates in a spherical model, if 2D rectangular coordinates in a panoramic image are known, coordinates in a corresponding spherical model can be obtained, and similarly if coordinates in a spherical model are known, 2D rectangular coordinates in a corresponding panoramic image can be obtained as well. Thus, free transformation can be realized between a panoramic image and a spherical model. Wherein, coordinates in a spherical model can comprise polar coordinates, or can also be 3D rectangular coordinates through transformation.

When the first panoramic image is a panoramic image to be compressed, the first panoramic image can be transformed into a first spherical model by the formula described above.

Step 102, generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user.

Users, when viewing a panoramic image, focus on a part of the image, this part of image should be retained as much as possible during compression as a main view image of users, whereas the part of the image that users don't focus on can be compressed greatly.

For example, a panoramic image is a panoramic image of a basketball game, the part that users focus on is an image related to the game in the playing area, this part is a main view image of users, and should be compressed as little as possible during compression so as to ensure the definitions and user experience, whereas the part that users don't focus on, such as audiences and benches, can have a large compression rate since its definition is not required to be very high.

Thus, the main view image of users can be obtained in advance for a first panoramic image. After a first spherical model is obtained, it is also possible to predetermine which part of a spherical surface the main view image of users is located in.

Figure 5:
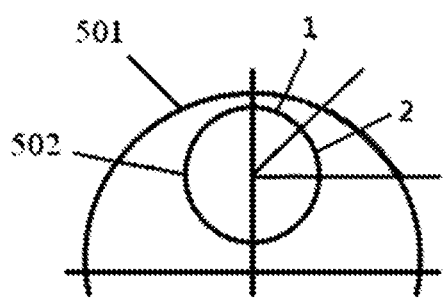
FIG. 5 is schematic diagram of generating a second spherical model within a first spherical model provided by embodiments of the present application.

Refer to FIG. 5, which is schematic diagram of generating a second spherical model within a first spherical model provided by embodiments of the present application, wherein, a second spherical model 502 is contained in a first spherical model 501, it is known that the image that users view at a main viewing angle locates in the upper half circle of the first spherical model, i.e., the image that users view at a main viewing angle corresponds to the top of the first spherical model 501, as a result, the spherical center of the second spherical model 502 locates between the spherical center of the first spherical model 501 and the top of the first spherical model 501.

Step 103, establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model.

A panoramic image and a spherical model can be mutually transformed based on formula (3) in step 101, thus a second spherical model, after generated, can be transformed into a second panoramic image, which, however, is only obtained by coordinate transformation of the second spherical model and only contains coordinates of pixels instead of specific values of pixels. A second panoramic image transformed from a second spherical model can be a blank panoramic image not containing pixels, and can also be a virtual logic panoramic image as long as the correspondence between the logic plane 2D rectangular coordinates in the second panoramic image and coordinates in the second spherical model is established.

After a second spherical model is generated within a first spherical model, it is possible to determine the mapping projection relationship between coordinates in the first spherical model and coordinates in the second spherical model, i.e., one point of coordinates in the second spherical model must correspond to one point of coordinates in the first spherical model.

By the mapping projection relationship between coordinates in the second spherical model and coordinates in the first spherical model as well as the mutual transformation relationship between a panoramic image and a spherical model, it is possible to establish a first mapping relationship between plane 2D rectangular coordinates in the second panoramic image and plane 2D rectangular coordinates in the first panoramic image.

Regarding each point in the second panoramic image, it is possible to obtain a point of coordinates in a first panoramic image corresponding thereto.

Step 104, sampling, from the first panoramic image, pixels corresponding to plane 2D rectangular coordinates in the second panoramic image according to the first mapping relationship to constitute the second panoramic image containing the pixels, so as to realize the compression of the first panoramic image.

After the first mapping relationship is established, corresponding target coordinates in the first panoramic image can be found according to coordinates of each pixel in the second panoramic image, and the pixel value of a pixel corresponding to the target coordinates in the first panoramic image can be sampled and filled into the second panoramic image. Coordinate point of each pixel in the second panoramic image is sampled once so as to constitute the second panoramic image containing pixel values of pixels.

The radius of the second spherical model is smaller than that of the first spherical model, thus the second panoramic image is smaller than the first panoramic image, i.e., total pixels of the second panoramic image is less than those of the first spherical model, realizing the compression of the first panoramic image.

The spherical center of the second spherical model is close to the main view image of users, referring to FIG. 5, in which the second spherical model 502 has two regions, i.e., region 1 and region 2. Region 1 and region 2 have the same area on the second spherical model 502, but corresponding first spherical models 502 have obviously different areas, region 1 corresponds to a smaller area, whereas region 2 corresponds to a larger area. When the second spherical model is transformed into the second panoramic image, region 1 and region 2 have a same area on the second panoramic image, i.e., have the same number of pixels. However, when sampling, sampling of the part corresponding to region 1 on the first panoramic image is performed densely whereas sampling of the part corresponding to region 2 on the first panoramic image is performed sparsely. And the part corresponding to region 1 is a main view image of users, so as to ensure a smaller compression rate for the main view image of users and a larger compression rate for the other part, realizing a non-uniform compression.

Of course, in embodiments of the present application, if the spherical center of the second spherical model 502 coincides with that of the first spherical model 501, an uniform compression of the first panoramic image can be realized.

In embodiments of the present application, through pixel sampling the first panoramic image according to coordinates in the second panoramic image after generating, within the first spherical model, the asymmetric second spherical model that is close to images at a main viewing angle of users and transforming the second spherical model into the second panoramic image, non-uniform compression of the first panoramic image can be realized, during which a higher sampling rate is utilized for images at a main viewing angle of users so as to ensure the definitions of the images at a main viewing angle of users and a lower sampling rate is utilized for the other images so that the second panoramic image compressed by the first panoramic image is smaller, which facilitates the storage, transmission and decoding of panoramic image files.

Optionally, in a panoramic image compression method provided by embodiments of the present application, generating a second spherical model within the first spherical model according to a main view image of users, comprises:

the first step: determining the radius of the second spherical model according to a preset resolution of the second panoramic image.

In many contexts in reality, it is possible to obtain beforehand the resolution of the second panoramic image after compression, or the target resolution after compression. The resolution can be represented by pixels, for example 1920×960 etc. Such resolution can be used as the width and height of the second panoramic image, i.e., n'=1920, m'=960, wherein n' is the width of the second panoramic image, m is the height of the second panoramic image, such that the radius R of the second panoramic image can be obtained by formula (1): $R=n'/(2\pi)$.

The second step: determining a location of the spherical center of the second spherical model in the first spherical model according to the main view image of the user.

The location of the spherical center of the second spherical model within the first spherical model can be determined according to different needs of users viewing the main view image. For example, when users do not view images other than a main view image, it is possible to make the spherical center of the second spherical model closer to the main view image of users. If users want to view some of the other images, the spherical center of the second spherical model can be biased to other images, if users want to view the overall images, the spherical center of the second spherical model can be set close to the spherical center of the first spherical model.

In embodiments of the present application, by presetting the radius of the second spherical model based on the preset resolution of the second panoramic image, the generation of the second spherical model is made easier and the target resolution after compression can be exactly achieved during image compression. By the main view image of users, it is possible to flexibly adjust the location of the spherical center of the second spherical model so as to obtain various non-uniform compression results, which satisfies requirements of different users.

Optionally, in a panoramic image compression method provided by embodiments of the present application, establishing a first mapping relationship between plane 2D rectangular coordinates in a second panoramic image and plane 2D rectangular coordinates in the first panoramic image, comprises:

the first step, establishing a first correspondence between plane 2D rectangular coordinates of all pixels in the first panoramic image and coordinates in the first spherical model.

The first correspondence between plane 2D rectangular coordinates of all pixels in the first panoramic image and coordinates in the first spherical model can be obtained based on equation three. Coordinates of each pixel in the first panoramic image can be obtained by the corresponding coordinates in the first spherical model.

The second step, establishing a second correspondence between coordinates in the first spherical model and coordinates in the second spherical model.

During the transformation of a panoramic image into a spherical model using formula (3), it is possible to establish a 3D rectangular coordinate system in the spherical model.

Specifically, during the transformation of 2D rectangular coordinates in a panoramic image into coordinates in a spherical model using formula (3), when in 2D rectangular coordinates in the panoramic image, $$x > \frac{m}{2},$$

φ transformed through coordinate x is positive, and when $$x < \frac{m}{2},$$

φ transformed through coordinate x is negative, similarly, when $$y > \frac{n}{2},$$

λ transformed through coordinate y is positive, and when $$y < \frac{n}{2},$$

λ transformed through coordinate y is negative. Wherein, x, y are plane 2D rectangular coordinates of a pixel in a spherical model, m is the height of a panoramic image, n is the width of a panoramic image, λ represents the longitude in coordinates in a spherical model, φ represents the latitude in coordinates in a spherical model. According to the sign, i.e., positive or negative, of λ and φ, it is possible to determine the x axis and the y axis of a 3D rectangular coordinate system of a spherical model, i.e., x axis determines the positive or negative angle of φ and y axis determines the positive or negative angle of λ. Z axis of a 3D rectangular coordinate system of a spherical model is mutually orthogonal to the x axis and y axis, and can be determined by the x axis and y axis.

Figure 6:
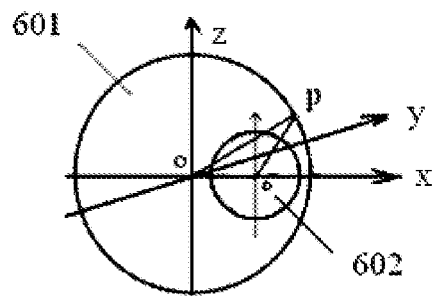
FIG. 6 is a schematic diagram of the location of the spherical center of a second spherical model provided by embodiments of the present application.

Refer to FIG. 6, which is a schematic diagram of the location of the spherical center of a second spherical model.

In FIG. 6, the spherical center of the second spherical model 602 locates on the x axis of a 3D rectangular coordinate system of the first spherical model 601 and the location of the spherical center of the second spherical model 602 in the 3D rectangular coordinate system of the first spherical model 601 is (t,0,0).

A coordinate point p being located in the first spherical model 601, using geometry methods, a linear equation can be established based on a straight line from the point p to the spherical center O of the first spherical model 601 and a straight line from the point p to the spherical center o of the second spherical model 602, for example, the linear equation can be:

$$\frac{R\cos\lambda\cos\varphi - t}{r\cos\lambda'\cos\varphi'} = \frac{R\sin\lambda\cos\varphi}{r\sin\lambda'\cos\varphi'} = \frac{R\sin\varphi - t}{r\sin\varphi'}$$

Wherein, λ represents the longitude of a coordinate in the first spherical model 601, and φ in this equation is φ. φ represents the latitude of a coordinate in the first spherical model 601, λ represents the longitude of a coordinate in the second spherical model 602, φ' represents the latitude of a coordinate in the second spherical model 602, R represents the radius of the first spherical model 601, t represents the location of the spherical center o of the second spherical model 602 on the x axis of the first spherical model 601.

In order to solve the above linear equation, when the spherical center o of the second spherical model 602 is located on the x axis of a 3D rectangular coordinate system of the first spherical model 601, formula (4) representing the second correspondence between coordinates in the first spherical model 601 and coordinates in the second spherical model 602 can be established, which is:

$$\sin\phi = \begin{cases} \dfrac{-b + \sqrt{b^2 - 4ac}}{2a} & \lambda' > 0 \\ \dfrac{-b - \sqrt{b^2 - 4ac}}{2a} & \lambda' \leq 0 \end{cases} \quad (4)$$

$$\sin\lambda = \cot\phi'\tan\varphi\sin\lambda'$$

Wherein, $$a = \tan^2\lambda',$$

$$b = \frac{2t}{R}(\cos\phi'\sin\phi'\tan\lambda'\sin\lambda'),$$

$$c = \left(\frac{t^2}{R^2} - 1\right)\tan^2\lambda'\sin^2\phi'$$

In the above formula (4), λ represents the longitude of a coordinate in the first spherical model 601, φ represents the latitude of a coordinate in the first spherical model 601, λ' represents the longitude of a coordinate in the second spherical model 602, φ' represents the latitude of a coordinate in the second spherical model 602, R represents the radius of the first spherical model 601, t represents the location of the spherical center o of the second spherical model 602 on the x axis of the first spherical model 601.

Formula (4) above is a formula deduced by a geometry method based on the geometric relationship between the first spherical model and the second spherical model and is not unique. Other formulas can also be deduced by other geometric methods, and can also reflect the correspondence between coordinates in the first spherical model and coordinates in the second spherical model. All the embodiments of the present application, as long as fulfilled by a formula reflecting the correspondence between coordinates in the first spherical model and coordinates in the second spherical model, fall within the protection scope of the embodiments of the present application.

The third step, establishing a third correspondence between coordinates in the second spherical model and plane 2D rectangular coordinates in the second panoramic image.

The third correspondence between coordinates in the second spherical model and plane 2D rectangular coordinates in the second panoramic image can be established by also applying equation three. Coordinates of each pixel, of the second panoramic image, to be filled can be obtained by the corresponding coordinates in the second spherical model.

The fourth step, correlating plane 2D rectangular coordinates in the second panoramic image to coordinates in the second spherical model according to the third correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the first mapping relationship between plane 2D rectangular coordinates in the second panoramic image and plane 2D rectangular coordinates in the first panoramic image.

By using formulas (3) and (4), it is possible to correlate plane 2D rectangular coordinates in the second panoramic image to coordinates in the second spherical model, and to coordinates in the first spherical model through coordinates in the second spherical model, and finally to plane 2D rectangular coordinates in the first panoramic image, for establishing a first mapping relationship.

In embodiments of the present application, by using formulas (3) and (4), the first mapping relationship between plane 2D rectangular coordinates in the second panoramic image and plane 2D rectangular coordinates in the first panoramic image is established, such that the correspondence of coordinates is more exact and is easier to realize in apparatuses such as computers, which improves the efficiency of correspondence of coordinates and further improves the compression efficiency.

Optionally, in a panoramic image compression method provided by embodiments of the present application, before establishing a second correspondence between coordinates in the first spherical model and coordinates in the second spherical model, the method can further comprise:

performing coordinate system transformation on a 3D rectangular coordinate system of the first spherical model when the spherical center of the second spherical model is not on the x axis of the 3D rectangular coordinate system of the first spherical model, wherein, the coordinate system transformation comprises: rotating the x axis of the first spherical model such that the spherical center of the second spherical model is on the x axis after rotation.

The location of the spherical center of the second spherical model is determined according to a main view image of users, and thus can be anywhere, when the spherical center of the second spherical model is not located on the x axis of a 3D rectangular coordinate system of the first spherical model, formula (4) can not be applied to establish the second correspondence between coordinates in the first spherical model and coordinates in the second spherical model. Thus, it is required to apply the following formula (5) to rotate a 3D rectangular coordinate system of the first spherical model such that the spherical center of the second spherical model is located on the x axis after rotation.

Assuming the location of the spherical center of the second spherical model on the first spherical model is represented as $(t, \lambda_0, \phi_0)$ using polar coordinates in the first spherical model, then formula (5) is:

$$\begin{bmatrix} x'' \\ y'' \\ z'' \end{bmatrix} = \begin{bmatrix} \cos(\phi_0)\cos(\lambda_0) & -\sin(\lambda_0) & -\sin(\phi_0)\cos(\lambda_0) \\ \cos(\phi_0)\sin(\lambda_0) & \cos(\lambda_0) & -\sin(\phi_0)\sin(\lambda_0) \\ \sin(\phi_0) & 0 & \cos(\phi_0) \end{bmatrix} \begin{bmatrix} x \\ y \\ z \end{bmatrix} \quad (5)$$

Wherein, x, y, z represent 3D rectangular coordinates in the first spherical model, x", y", z" represent 3D rectangular coordinates in the first spherical model after the coordinate system is rotated, $\lambda_0$ represents the longitude of the spherical center of the second spherical model in coordinates in the first spherical model, $\phi_0$ represents the latitude of the spherical center of the second spherical model in coordinates in the first spherical model.

Before the application of formula (5), it is required to apply formula (2) to transform polar coordinates in the first spherical model into 3D rectangular coordinates x, y, z in the first spherical model, and the 3D rectangular coordinates in the first spherical model that are obtained after transformation by formula (5) is x", y", z", similarly, it is possible to transform 3D rectangular coordinates in the first spherical model into polar coordinates in the first spherical model according to the inverse operation of formula (2). Results finally obtained in this way can be directly substituted into formula (4) for calculation, so as to establish the second correspondence between coordinates in the first spherical model and coordinates in the second spherical model.

Optionally, in a panoramic image compression method provided by embodiments of the present application, after establishing a second correspondence between coordinates in the first spherical model and coordinates in the second spherical model, the method can further comprise:

the first step, generating a 2D projection plane that can be directly viewed by users through the second spherical model, and establishing the fourth correspondence between coordinates in the second spherical model and plane 2D rectangular coordinates of the 2D projection plane.

Figure 7:
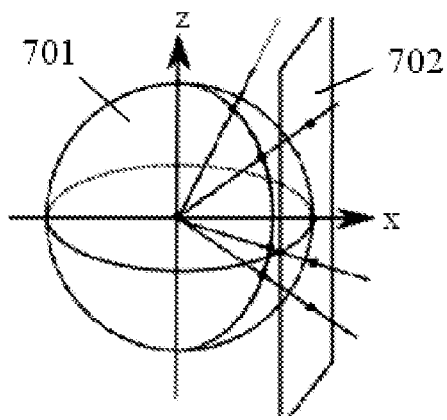
FIG. 7 is a schematic diagram of projecting a spherical model into a 2D projection plane provided by embodiments of the present application.

Refer to FIG. 7, which is a schematic diagram of projecting a spherical model into a 2D projection plane.

The panoramic image can be considered as the display of coordinates of a spherical model, and is required to conform with the monocular imaging principle when rendered to a screen or HMD (Head Mount Display), i.e., the image finally displayed on a screen or HMD is a perspective 2D projection plane without distortion that can be viewed by users.

In FIG. 7, the fourth correspondence between coordinates in the second spherical model 701 and plane 2D rectangular coordinates of the 2D projection plane 702 can be established using formula (6), which is:

$$\lambda' = \arctan\left(\frac{x'}{r}\right), \quad (6)$$

$$\phi' = \arccos\left(y' * \frac{\cos\left(\arctan\left(\frac{x'}{r}\right)\right)}{r}\right)$$

Wherein, λ' represents the longitude in coordinates in the second spherical model 701, φ' represents the latitude in coordinates in the second spherical model 701, and x' and y' represent plane 2D rectangular coordinates of a 2D projection plane 702, r represents the radius of the second spherical model.

The second step, correlating plane 2D rectangular coordinates of the 2D projection plane to coordinates in the second spherical model through the fourth correspondence, correlating coordinates in the second spherical model to coordinates in the first spherical model through the second correspondence, and correlating coordinates in the first spherical model to plane 2D rectangular coordinates in the first panoramic image through the first correspondence, so as to establish the second mapping relationship between plane 2D rectangular coordinates of the 2D projection plane and plane 2D rectangular coordinates in the first panoramic image.

By using formula (6), it is possible to correlate plane 2D rectangular coordinates of the 2D projection plane coordinates in the second spherical model, and to coordinates in the first spherical model through coordinates in the second spherical model, and finally to plane 2D rectangular coordinates in the first panoramic image, establishing a second mapping relationship.

The third step, sampling, from the first panoramic image, all pixels corresponding to plane 2D rectangular coordinates in the 2D projection plane according to the second mapping relationship to constitute the 2D projection plane containing pixels that can be directly viewed by users.

After the establishment of the second mapping relationship, it is possible to find, according to each point in a 2D projection plane, the corresponding coordinates in the first panoramic image, and to sample the corresponding pixel of coordinates so as to be filled onto the 2D projection plane. Coordinate point of each pixel in a 2D projection plane is sampled once so as to constitute a 2D projection plane containing pixels that can be directly viewed by users.

In embodiments of the present application, after the generation of the second spherical model, it is possible to establish the fourth correspondence between coordinates in the second spherical model and coordinates of a 2D projection plane that can be directly viewed by users, and thus to constitute the second mapping relationship, and then to sample pixels from the first panoramic image based on the 2D projection plane, so as to generate the 2D projection plane containing pixels. In this way, during the compression of the first panoramic image, it is possible to generate a 2D projection plane that can be directly viewed by users, thereby realizing the real-time compression and display and expanding the usage range of embodiments of the present application.

That is to say, the first step to the third step described above provide a panoramic image displaying method, comprising the following steps 1 to 4:

step 1: obtaining a first spherical model formed by a first panoramic image to be compressed, wherein there is a correspondence between plane 2D rectangular coordinates of all pixels in the first panoramic image and coordinates in the first spherical model; step 2: generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

step 3: establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; step 4: sampling, from the first panoramic image, pixels corresponding to plane 2D rectangular coordinates in the 2D projection plane according to the second mapping relationship to constitute the 2D projection plane containing the pixels that is viewable directly by the user.

As can be seen from above, by non-uniformly sampling a panoramic image to be compressed, the present embodiment compresses the panoramic image to be compressed while a non-uniform 2D projection plane that can be directly viewed is formed by the panoramic image to be compressed, during which a higher sampling rate is utilized for images at a main viewing angle of users so as to ensure the definitions of the images at a main viewing angle of users and a lower sampling rate is utilized for the other images so that the overall size of the 2D projection plane map is small. Thus, the present embodiment enables to display images clearly and meanwhile enables the displayed image of a 2D projection plane to be an image after compression.

Optionally, in a panoramic image displaying method provided by embodiments of the present application, generating a second spherical model within the first spherical model according to a main view image of users, comprises:

determining the radius of the second spherical model according to a preset resolution of the second panoramic image; and determining a location of the spherical center of the second spherical model in the first spherical model according to the main view image of the user.

In the present embodiment, by presetting the radius of the second spherical model based on the preset resolution of the second panoramic image, the generation of the second spherical model is made easier and the target resolution after compression can be exactly achieved during image compression. By the main view image of users, it is possible to flexibly adjust the location of the spherical center of the second spherical model so as to obtain various non-uniform compression results, which satisfies requirements of different users.

Optionally, in a panoramic image displaying method provided by embodiments of the present application, establishing a second mapping relationship between plane 2D rectangular coordinates of a 2D projection plane and plane 2D rectangular coordinates in the first panoramic image, can comprise:

establishing a first correspondence between plane 2D rectangular coordinates of all pixels in the first panoramic image and coordinates in the first spherical model;

establishing a second correspondence between coordinates in the first spherical model and coordinates in the second spherical model;

establishing a fourth correspondence between coordinates in the second spherical model and plane 2D rectangular coordinates of the 2D projection plane; and correlating plane 2D rectangular coordinates of the 2D projection plane to coordinates in the second spherical model according to the fourth correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the second mapping relationship between plane 2D rectangular coordinates of the 2D projection plane and plane 2D rectangular coordinates in the first panoramic image.

In embodiments of the present application, the fourth correspondence can be obtained by formula (6), i.e., the first mapping relationship between plane 2D rectangular coordinates of a 2D projection plane and plane 2D rectangular coordinates in the first panoramic image is established by using formulas (3) and (4), such that the correspondence of coordinates is more exact and is easier to realize in apparatuses such as computers, which improves the efficiency of correspondence of coordinates and further improves the compression efficiency.

Optionally, in a panoramic image displaying method provided by embodiments of the present application, before establishing a second correspondence between coordinates in the first spherical model and coordinates in the second spherical model, the method can further comprise:

performing coordinate system transformation on a 3D rectangular coordinate system of the first spherical model when the spherical center of the second spherical model is not located at x axis of the 3D rectangular coordinate system of the first spherical model, wherein, the coordinate system transformation comprises: rotating the x axis of the first spherical model such that the spherical center of the second spherical model is located at the rotated x axis.

In embodiments of the present application, when the spherical center of the second spherical model is not on the x axis of a 3D rectangular coordinate system of the first spherical model, the spherical center of the second spherical model is made located on the x axis after rotation by coordinate system transformation, which can facilitate the establishment of the second correspondence between coordinates in the first spherical model and coordinates in the second spherical model and reduce the processing complexity.

Figure 8:
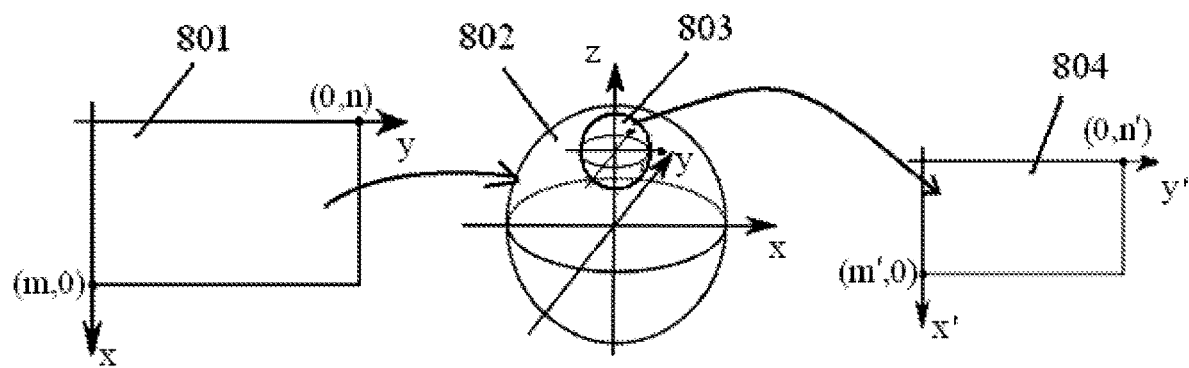
FIG. 8 is a schematic flowchart of a panoramic image compression method provided by embodiments of the present application.

Refer to FIG. 8, which is a flowchart of a panoramic image compression method provided by embodiments of the present application, comprising the following steps.

The first step, obtaining a first panoramic image 801, whose resolution is 3840×1920, indicating that for the first panoramic image, the width n=3840, and the height m=1920.

The second step, transforming all plane 2D rectangular coordinates corresponding to pixels in the first panoramic image 801 into coordinates in a spherical model, forming a first spherical model 802 and establishing the first correspondence between plane 2D rectangular coordinates in the first panoramic image 801 and coordinates in the first spherical model 802, determining the radius of the first spherical model 802 by formula (1) as $$R = \frac{3840}{2\pi}.$$

The third step, compressing the first panoramic image into a panoramic image of 1920×960, i.e., the resolution of the second panoramic image 804 obtained after compression being 1920×960, i.e., for the second panoramic image, the width n=1920, and the height m=960, and thus obtaining the radius of the second spherical model 803 according to formula (1) as $$r = \frac{1920}{2\pi}.$$

The fourth step, determining the location of the spherical center of the second spherical model 803 according to the preset image at a main viewing angle of users and the radius of the second spherical model.

The fifth step, performing coordinate system transformation on a 3D rectangular coordinate system of the first spherical model 802 by using formulas (2) and (5), specifically, rotating the x axis of the first spherical model 802 such that the spherical center of the second spherical model 803 is located on the x axis after rotation.

The sixth step, establishing a second correspondence between coordinates in the first spherical model 802 and coordinates in the second spherical model 803 by using formula (4).

The seventh step, transforming coordinates in the second spherical model 803 into 2D rectangular coordinates by using formula (2) so as to form a second panoramic image 804 not containing pixels, establishing a third correspondence between plane 2D rectangular coordinates in the second panoramic image 804 and coordinates in the second spherical model 803.

The eighth step, correlating coordinates of each pixel in the second panoramic image 804 to coordinates of a pixel in the first panoramic image 801 based on the first mapping relationship constituted by the third correspondence, the second correspondence and the first correspondence.

The final step, sampling, from the first panoramic image 801, all pixels corresponding to coordinates of a pixel in the second panoramic image 804 so as to constitute the second panoramic image 804 containing pixels. Thus, the compression of the first panoramic image 801 is realized.

Figure 9:
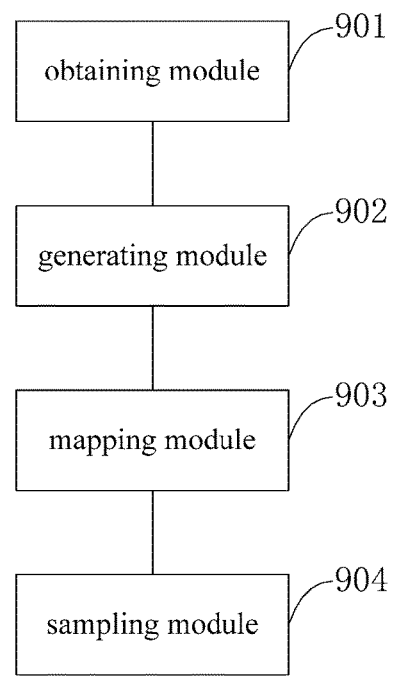
FIG. 9 is a structure diagram of a panoramic image compression device provided by embodiments of the present application.

Referring to FIG. 9, which is a structure diagram of a panoramic image compression device provided by embodiments of the present application, comprising:

an obtaining module 901, used for obtaining a first spherical model formed by a first panoramic image to be compressed, wherein there is a correspondence between plane 2D rectangular coordinates of all pixels in the first panoramic image and coordinates in the first spherical model;

a generating module 902, used for generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

a mapping module 903, used for establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and a sampling module 904, used for sampling, from the first panoramic image, pixels corresponding to plane 2D rectangular coordinates in the second panoramic image according to the first mapping relationship to constitute the second panoramic image containing the pixels, so as to realize the compression of the first panoramic image.

In embodiments of the present application, through pixel sampling the first panoramic image according to coordinates in the second panoramic image after generating, within the first spherical model, the asymmetric second spherical model that is close to images at a main viewing angle of users and transforming the second spherical model into the second panoramic image, non-uniform compression of the first panoramic image can be realized, during which a higher sampling rate is utilized for images at a main viewing angle of users so as to ensure the definitions of the images at a main viewing angle of users and a lower sampling rate is utilized for the other images so that the second panoramic image compressed by the first panoramic image is smaller, which facilitates the storage, transmission and decoding of panoramic image files.

The device provided by embodiments of the present application is a device applying the panoramic image compression method described above, thus all embodiments of the panoramic image compression method described above are applicable to this device and they can achieve same or similar beneficial effects.

Optionally, in a panoramic image compression device provided by embodiments of the present application, the generating module 902 is specifically used for:

determining the radius of the second spherical model according to a preset resolution of the second panoramic image; and determining a location of the spherical center of the second spherical model in the first spherical model according to the main view image of the user.

Optionally, in a panoramic image compression device provided by embodiments of the present application, the mapping module 903 comprises:

a first corresponding submodule used for establishing a first correspondence between plane 2D rectangular coordinates of all pixels in the first panoramic image and coordinates in the first spherical model;

a second corresponding submodule used for establishing a second correspondence between coordinates in the first spherical model and coordinates in the second spherical model;

a third corresponding submodule used for establishing a third correspondence between coordinates in the second spherical model and plane 2D rectangular coordinates in the second panoramic image; and a first mapping submodule used for correlating plane 2D rectangular coordinates in the second panoramic image to coordinates in the second spherical model according to the third correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the first mapping relationship between plane 2D rectangular coordinates in the second panoramic image and plane 2D rectangular coordinates in the first panoramic image.

Optionally, in a panoramic image compression device provided by embodiments of the present application, the device further comprises:

a selection submodule used for, before the second corresponding submodule establishing a second correspondence between coordinates in the first spherical model and coordinates in the second spherical model, performing coordinate system transformation on a 3D rectangular coordinate system of the first spherical model when the spherical center of the second spherical model is not located at x axis of the 3D rectangular coordinate system of the first spherical model, wherein, the coordinate system transformation comprises: rotating the x axis of the first spherical model such that the spherical center of the second spherical model is located at the rotated x axis.

Embodiments of the present application further provide a panoramic image displaying device, comprising:

an obtaining module used for obtaining a first spherical model formed by a first panoramic image to be compressed, wherein there is a correspondence between plane 2D rectangular coordinates of all pixels in the first panoramic image and coordinates in the first spherical model;

a generating module used for generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than radius of the first spherical model, and the main view image of the user is a partial image of the first panoramic image that is viewed mainly by the user;

a mapping establishment module used for establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and a pixel sampling module used for sampling, from the first panoramic image, pixels corresponding to plane 2D rectangular coordinates in the 2D projection plane according to the second mapping relationship to constitute the 2D projection plane containing the pixels that is viewable directly by the user.

As can be seen from above, by non-uniformly sampling a panoramic image to be compressed, the present embodiment can compress the panoramic image to be compressed while a non-uniform 2D projection plane that can be directly viewed is formed by the panoramic image to be compressed, during which a higher sampling rate is utilized for images at a main viewing angle of users so as to ensure the definitions of the images at a main viewing angle of users and a lower sampling rate is utilized for the other images. Thus, the present embodiment enables to display images clearly and meanwhile enables the displayed image of a 2D projection plane to be an image after compression.

Optionally, in a panoramic image displaying device provided by the present embodiment, the mapping establishment module can be specifically used for:

establishing a first correspondence between plane 2D rectangular coordinates of all pixels in the first panoramic image and coordinates in the first spherical model;

establishing a second correspondence between coordinates in the first spherical model and coordinates in the second spherical model;

establishing a fourth correspondence between coordinates in the second spherical model and plane 2D rectangular coordinates of the 2D projection plane; and correlating plane 2D rectangular coordinates of the 2D projection plane to coordinates in the second spherical model according to the fourth correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the second mapping relationship between plane 2D rectangular coordinates of the 2D projection plane and plane 2D rectangular coordinates in the first panoramic image.

The embodiments of a device described above are obtained based on embodiments of the method and have the same technical effects with the method, thus the technical effects of the embodiments of a device will not be repeatedly described here. The embodiments of a device are briefly described and reference can be made to the description of the embodiments of a method for its related contents since the embodiments of the device are substantially similar to those of the method.

Embodiments of the present application provide an electronic apparatus, which comprises: a processor, a communication interface, a memory and a communication bus, wherein the processor, the communication interface and the memory are communicated with each other via the communication bus;

the memory is used for storing a computer program; and the processor is used for executing the program stored in the memory, so as to implement the panoramic image compression method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and sampling, from the first panoramic image, pixels corresponding to plane 2D rectangular coordinates in the second panoramic image according to the first mapping relationship to constitute the second panoramic image containing the pixels, so as to realize the compression of the first panoramic image.

The communication bus mentioned for the electronic apparatus can be a Peripheral Component Interconnect (PCI) bus or an Extended Industry Standard Architecture (EISA) bus and the like. The communication bus can be divided into an address bus, a data bus, a control bus and so on. For the convenience of representation, it is represented only by one thick line in the figure, which however does not mean that there is only one bus or one type of buses.

A communication interface is used for communication between the electronic device described above and other devices.

The memory may include a random access memory (RAM), and may also include a non-volatile memory (NVM), e.g., at least one disk memory. Optionally, the memory can also be at least one memory device located away from the aforementioned processor.

The processor can be a general-purpose processor, including a central processing unit (CPU), a network processor (NP) and the like; and can also be a digital signal processing (DSP), an application specific integrated circuit (ASIC), a field-programmable gate array (FPGA), or other programmable logic devices, discrete gates or transistor logic devices, discrete hardware components.

The present embodiment is obtained based on the same inventive idea with the embodiment of the method as shown in FIG. 1, thus the specific implementations of the present embodiment can all apply the content in the embodiment of the method as shown in FIG. 1.

In embodiments of the present application, a panoramic image to be compressed can be compressed into an non-uniform panoramic image by non-uniformly sampling the panoramic image to be compressed, for a part of images at a main viewing angle of users, a higher sampling rate is set so as to guarantee the definitions of images viewed by users, and for the other part of images, a lower sampling rate is utilized so as to enable a smaller panoramic image after overall compression and facilitate the storage, transmission and decoding.

Embodiments of the present application provide another electronic apparatus, which comprises: a processor, a communication interface, a memory and a communication bus, wherein the processor, the communication interface and the memory are communicated with each other via the communication bus;

the memory is used for storing a computer program; and the processor is used for executing the program stored in the memory, so as to implement the panoramic image displaying method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and sampling, from the first panoramic image, pixels corresponding to plane 2D rectangular coordinates in the 2D projection plane according to the second mapping relationship to constitute the 2D projection plane containing the pixels that is viewable directly by the user.

As can be seen from above, by non-uniformly sampling a panoramic image to be compressed, the present embodiment can compress the panoramic image to be compressed while a non-uniform 2D projection plane that can be directly viewed is formed by the panoramic image to be compressed, during which a higher sampling rate is utilized for images at a main viewing angle of users so as to ensure the definitions of the images at a main viewing angle of users and a lower sampling rate is utilized for the other images. Thus, the present embodiment enables to display images clearly and meanwhile enables the displayed image of a 2D projection plane to be an image after compression.

Embodiments of the present application provide a computer readable storage medium, which stores a computer program thereon, and when being executed by a processor, the computer program implements the panoramic image compression method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and sampling, from the first panoramic image, pixels corresponding to plane 2D rectangular coordinates in the second panoramic image according to the first mapping relationship to constitute the second panoramic image containing the pixels, so as to realize the compression of the first panoramic image.

In embodiments of the present application, a panoramic image to be compressed can be compressed into an non-uniform panoramic image by non-uniformly sampling the panoramic image to be compressed, for a part of images at a main viewing angle of users, a higher sampling rate is set so as to guarantee the definitions of images viewed by users, and for the other part of images, a lower sampling rate is utilized so as to enable a smaller panoramic image after overall compression and facilitate the storage, transmission and decoding.

Embodiments of the present application provide a computer readable storage medium, which stores a computer program thereon, and when being executed by a processor, the computer program implements the panoramic image displaying method provided by embodiments of the present application, comprising:

obtaining a first spherical model formed by a first panoramic image to be compressed, wherein there is a correspondence between plane 2D rectangular coordinates of all pixels in the first panoramic image and coordinates in the first spherical model;

generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;

establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and sampling, from the first panoramic image, pixels corresponding to plane 2D rectangular coordinates in the 2D projection plane according to the second mapping relationship to constitute the 2D projection plane containing the pixels that is viewable directly by the user.

As can be seen from above, by non-uniformly sampling a panoramic image to be compressed, the present embodiment can compress the panoramic image to be compressed while a non-uniform 2D projection plane that can be directly viewed is formed by the panoramic image to be compressed, during which a higher sampling rate is utilized for images at a main viewing angle of users so as to ensure the definitions of the images at a main viewing angle of users and a lower sampling rate is utilized for the other images. Thus, the present embodiment enables to display images clearly and meanwhile enables the displayed image of a 2D projection plane to be an image after compression.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

All embodiments in the description are described in a correlated manner, and identical or similar parts in various embodiments can be referred to one another, the description for each embodiment all focuses on the differences with other embodiments.

The embodiments described above are just preferable embodiments of the present application, and not indented to limit the protection scope of the present application. Any modifications, alternatives, improvements or the like within the spirit and principle of the present application shall be comprised in the protection scope of the present application.

The invention claimed is:

1. A panoramic image compression method, comprising:
obtaining a first spherical model formed by a first panoramic image to be compressed, wherein there is a correspondence between plane 2D rectangular coordinates of all pixels in the first panoramic image and coordinates in the first spherical model;
generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;
establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and
sampling, from the first panoramic image, pixels corresponding to plane 2D rectangular coordinates in the second panoramic image according to the first mapping relationship to constitute the second panoramic image containing the pixels, so as to realize the compression of the first panoramic image;
wherein, generating a second spherical model in the first spherical model according to a main view image of users comprises:
determining the radius of the second spherical model according to a preset resolution of the second panoramic image; and
determining a location of the spherical center of the second spherical model in the first spherical model according to the main view image of the user.

2. The method according to claim 1, wherein, establishing a first mapping relationship between plane 2D rectangular coordinates in a second panoramic image and plane 2D rectangular coordinates in the first panoramic image comprises:
establishing a first correspondence between plane 2D rectangular coordinates of all pixels in the first panoramic image and coordinates in the first spherical model;
establishing a second correspondence between coordinates in the first spherical model and coordinates in the second spherical model;
establishing a third correspondence between coordinates in the second spherical model and plane 2D rectangular coordinates in the second panoramic image; and
correlating plane 2D rectangular coordinates in the second panoramic image to coordinates in the second spherical model according to the third correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the first mapping relationship between plane 2D rectangular coordinates in the second panoramic image and plane 2D rectangular coordinates in the first panoramic image.

3. The method according to claim 2, wherein, before establishing a second correspondence between coordinates in the first spherical model and coordinates in the second spherical model, the method further comprises:
performing coordinate system transformation on a 3D rectangular coordinate system of the first spherical model when the spherical center of the second spherical model is not located at x axis of the 3D rectangular coordinate system of the first spherical model, wherein, the coordinate system transformation comprises: rotating the x axis of the first spherical model such that the spherical center of the second spherical model is located at the rotated x axis.

4. A panoramic image displaying method, comprising:
obtaining a first spherical model formed by a first panoramic image to be compressed, wherein there is a correspondence between plane 2D rectangular coordinates of all pixels in the first panoramic image and coordinates in the first spherical model;
generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;
establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and
sampling, from the first panoramic image, pixels corresponding to plane 2D rectangular coordinates in the 2D projection plane according to the second mapping relationship to constitute the 2D projection plane containing the pixels that is viewable directly by the user;
wherein, generating a second spherical model in the first spherical model according to a main view image of users comprises:
determining the radius of the second spherical model according to a preset resolution of the second panoramic image; and
determining a location of the spherical center of the second spherical model in the first spherical model according to the main view image of the user.

5. The method according to claim 4, wherein, establishing a second mapping relationship between plane 2D rectangular coordinates of a 2D projection plane and plane 2D rectangular coordinates in the first panoramic image comprises:
establishing a first correspondence between plane 2D rectangular coordinates of all pixels in the first panoramic image and coordinates in the first spherical model;
establishing a second correspondence between coordinates in the first spherical model and coordinates in the second spherical model;
establishing a fourth correspondence between coordinates in the second spherical model and plane 2D rectangular coordinates of the 2D projection plane; and
correlating plane 2D rectangular coordinates of the 2D projection plane to coordinates in the second spherical model according to the fourth correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the second mapping relationship between plane 2D rectangular coordinates of the 2D projection plane and plane 2D rectangular coordinates in the first panoramic image.

6. An electronic apparatus, comprises: a processor,
the memory is used for storing a computer program; and
the processor is used for performing the following operations by executing the computer program stored on the memory:
obtaining a first spherical model formed by a first panoramic image to be compressed, wherein there is a correspondence between plane 2D rectangular coordinates of all pixels in the first panoramic image and coordinates in the first spherical model;
generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;
establishing a first mapping relationship between plane 2D rectangular coordinates in a second panoramic image and plane 2D rectangular coordinates in the first panoramic image, wherein the second panoramic image is a panoramic image obtained by unfolding the second spherical model, and there is a correspondence between plane 2D rectangular coordinates in the second panoramic image and coordinates in the second spherical model; and
sampling, from the first panoramic image, pixels corresponding to plane 2D rectangular coordinates in the second panoramic image according to the first mapping relationship to constitute the second panoramic image containing the pixels, so as to realize the compression of the first panoramic image;
wherein, generating a second spherical model in the first spherical model according to a main view image of users comprises:
determining the radius of the second spherical model according to a preset resolution of the second panoramic image; and
determining a location of the spherical center of the second spherical model in the first spherical model according to the main view image of the user.

7. An electronic apparatus, comprises: a processor,
the memory is used for storing a computer program; and
the processor is used for performing the following operations by executing the computer program stored on the memory:
obtaining a first spherical model formed by a first panoramic image to be compressed, wherein there is a correspondence between plane 2D rectangular coordinates of all pixels in the first panoramic image and coordinates in the first spherical model;
generating a second spherical model in the first spherical model according to a main view image of an user, wherein the second spherical model is contained in the first spherical model, the spherical center of the second spherical model is located between the spherical center of the first spherical model and the main view image of the user, the radius of the second spherical model is smaller than the radius of the first spherical model, and the main view image of the user is a partial image of the first panoramic image that is viewed mainly by the user;
establishing a second mapping relationship between plane 2D rectangular coordinates of a 2D projection plane and plane 2D rectangular coordinates in the first panoramic image, wherein the 2D projection plane is a projection plane generated through the second spherical model, and there is a correspondence between plane 2D rectangular coordinates of the 2D projection plane and coordinates in the second spherical model; and
sampling, from the first panoramic image, pixels corresponding to plane 2D rectangular coordinates in the 2D projection plane according to the second mapping relationship to constitute the 2D projection plane containing the pixels that is viewable directly by the user;
wherein, generating a second spherical model in the first spherical model according to a main view image of users comprises:
determining the radius of the second spherical model according to a preset resolution of the second panoramic image; and
determining a location of the spherical center of the second spherical model in the first spherical model according to the main view image of the user.

8. A non-transitory computer readable storage medium, wherein the computer readable storage medium stores a computer program thereon, and when being executed by a processor, the computer program implements the method according to claim 1.

9. A non-transitory computer readable storage medium, wherein the computer readable storage medium stores a computer program thereon, and when being executed by a processor, the computer program implements the method according to claim 4.

10. The electronic apparatus according to claim 6, wherein, establishing a first mapping relationship between plane 2D rectangular coordinates in a second panoramic image and plane 2D rectangular coordinates in the first panoramic image comprises:

establishing a first correspondence between plane 2D rectangular coordinates of all pixels in the first panoramic image and coordinates in the first spherical model;

establishing a second correspondence between coordinates in the first spherical model and coordinates in the second spherical model;

establishing a third correspondence between coordinates in the second spherical model and plane 2D rectangular coordinates in the second panoramic image; and correlating plane 2D rectangular coordinates in the second panoramic image to coordinates in the second spherical model according to the third correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the first mapping relationship between plane 2D rectangular coordinates in the second panoramic image and plane 2D rectangular coordinates in the first panoramic image.

11. The electronic apparatus according to claim 10, wherein, before establishing a second correspondence between coordinates in the first spherical model and coordinates in the second spherical model, the method further comprises:

performing coordinate system transformation on a 3D rectangular coordinate system of the first spherical model when the spherical center of the second spherical model is not located at x axis of the 3D rectangular coordinate system of the first spherical model, wherein, the coordinate system transformation comprises: rotating the x axis of the first spherical model such that the spherical center of the second spherical model is located at the rotated x axis.

12. The electronic apparatus according to claim 7, wherein, establishing a second mapping relationship between plane 2D rectangular coordinates of a 2D projection plane and plane 2D rectangular coordinates in the first panoramic image comprises:

establishing a first correspondence between plane 2D rectangular coordinates of all pixels in the first panoramic image and coordinates in the first spherical model;

establishing a second correspondence between coordinates in the first spherical model and coordinates in the second spherical model;

establishing a fourth correspondence between coordinates in the second spherical model and plane 2D rectangular coordinates of the 2D projection plane; and correlating plane 2D rectangular coordinates of the 2D projection plane to coordinates in the second spherical model according to the fourth correspondence, correlating coordinates in the second spherical model to coordinates in the first spherical model according to the second correspondence, and correlating coordinates in the first spherical model to plane 2D rectangular coordinates in the first panoramic image according to the first correspondence, so as to establish the second mapping relationship between plane 2D rectangular coordinates of the 2D projection plane and plane 2D rectangular coordinates in the first panoramic image.

* * * * *